W. J. HANNAM.
TRAILER FOR CAMPING PURPOSES.
APPLICATION FILED MAR. 15, 1919.
1,336,627.  
Patented Apr. 13, 1920.  
3 SHEETS—SHEET 1.
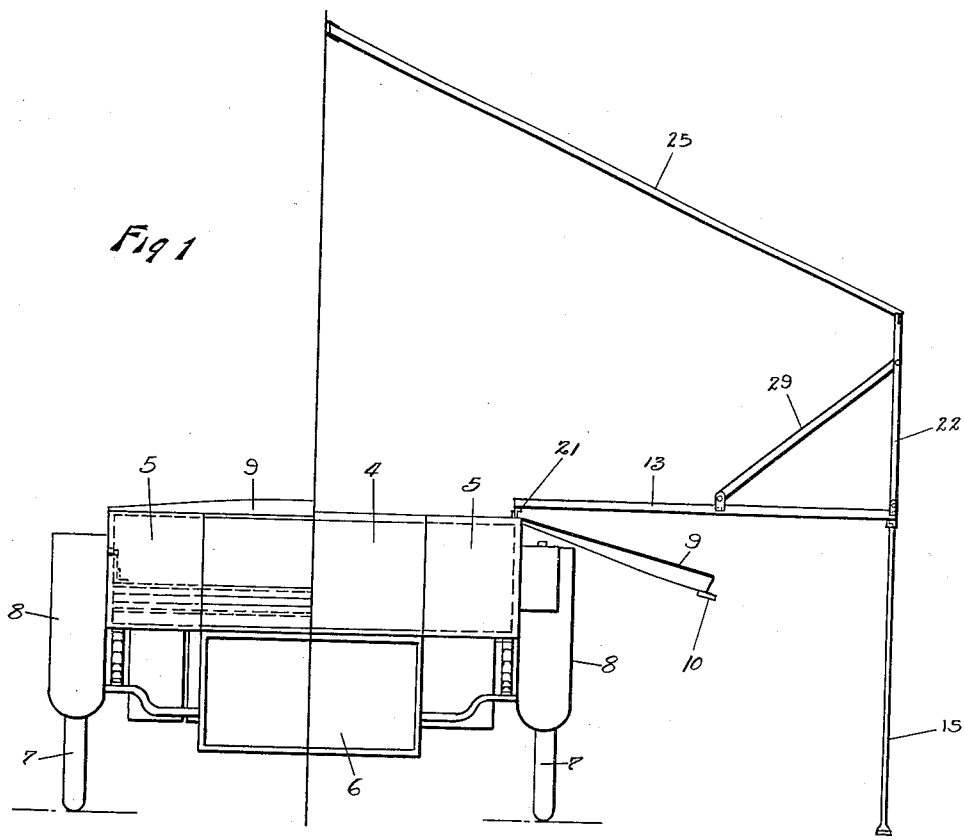

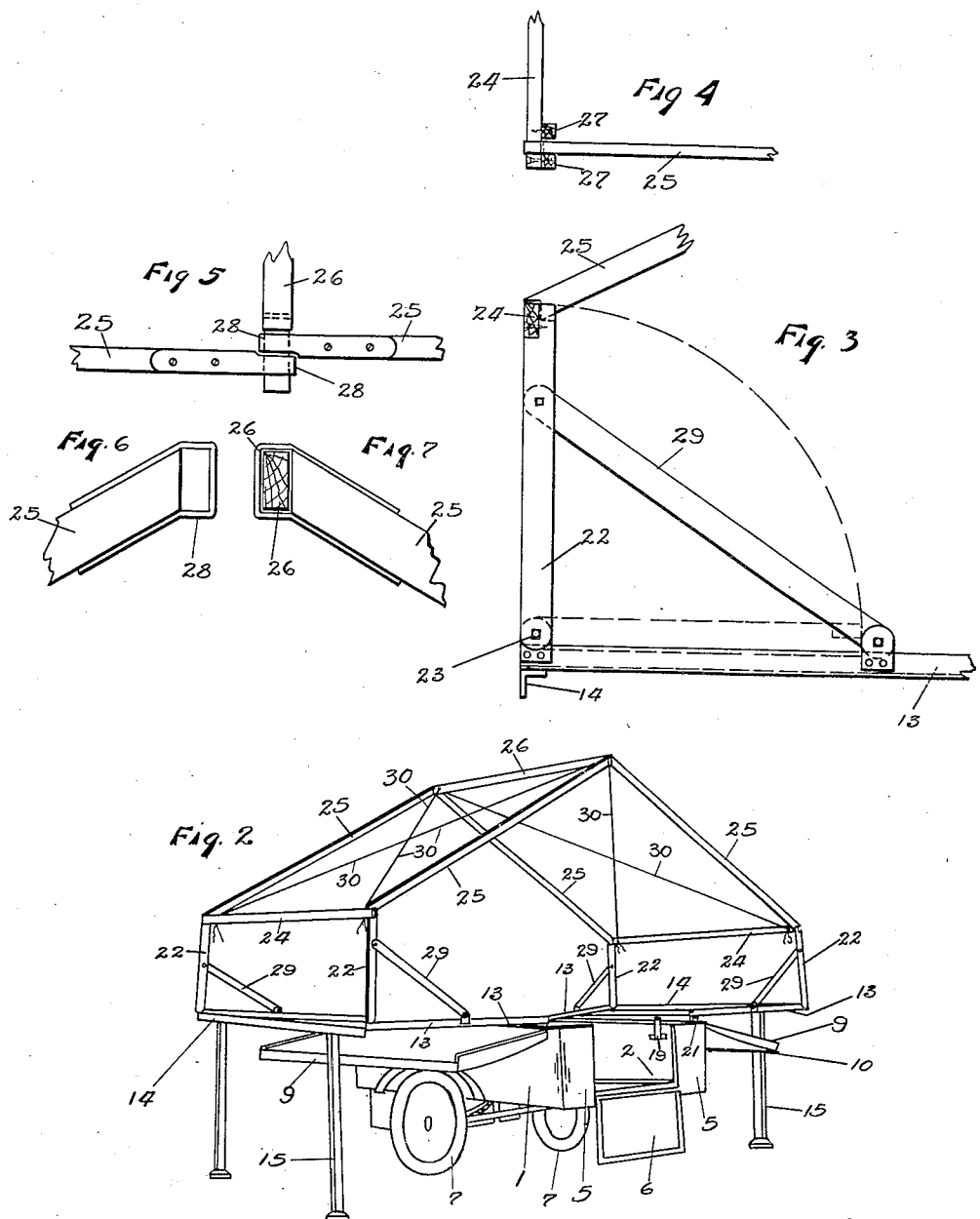

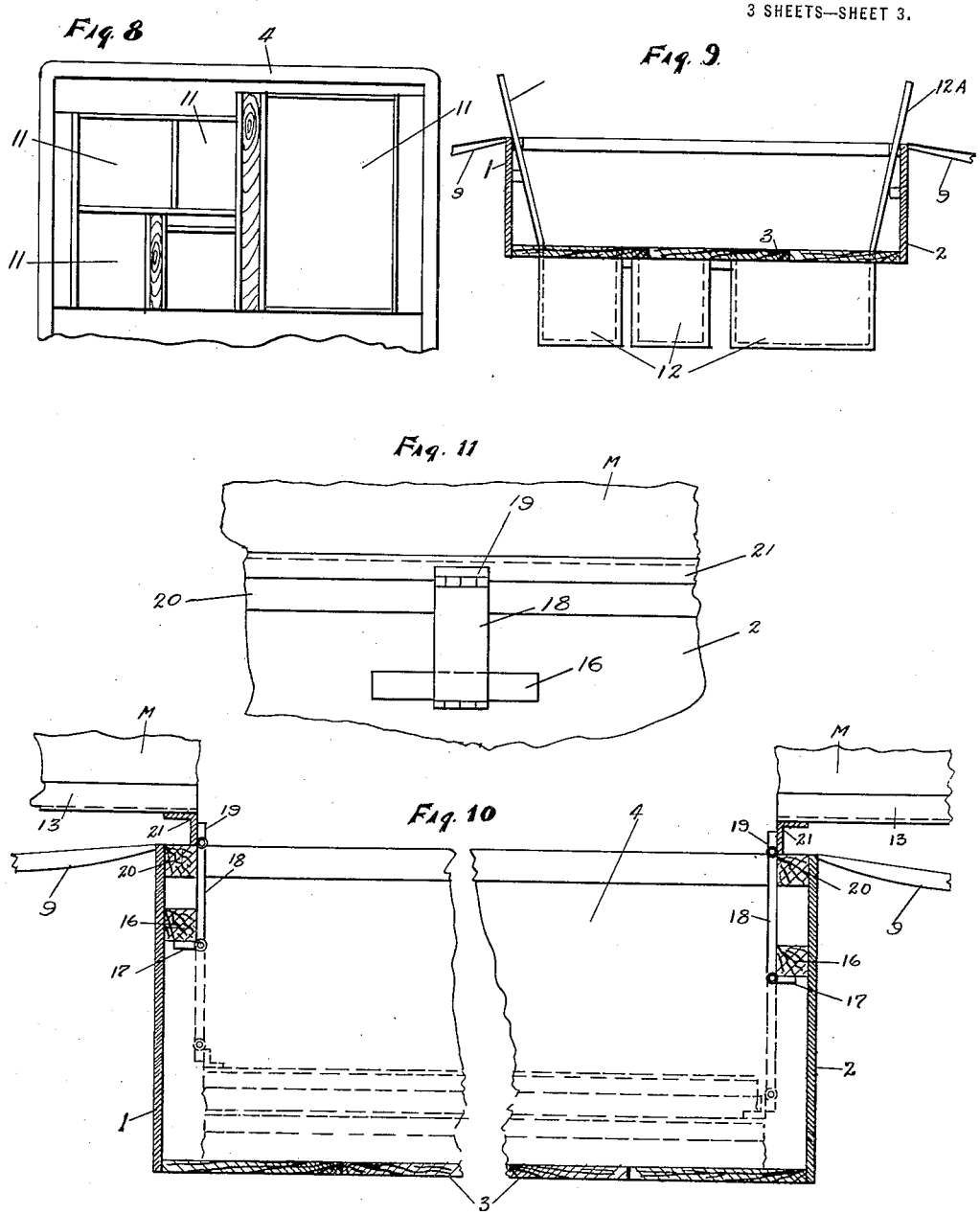

UNITED STATES PATENT OFFICE.

WILLIAM J. HANNAM, OF SPRINGFIELD, OHIO.

TRAILER FOR CAMPING PURPOSES.

1,336,627.          Specification of Letters Patent.          Patented Apr. 13, 1920.

Application filed March 15, 1919. Serial No. 282,778.

*To all whom it may concern:*

Be it known that I, WILLIAM J. HANNAM, a citizen of the United States, residing at Springfield, in the county of Clark and State of Ohio, have invented certain new and useful Improvements in Trailers for Camping Purposes, of which the following is a specification.

My invention relates to improvements in camping vehicles, it more particularly relating to a vehicle of this character which can be trailed from the rear of an automobile.

The object of the invention is to provide a construction which will be simple in its arrangement of parts, easily and quickly converted into a camping outfit and as readily folded and stored in compact form in the vehicle body and also one which will be weather proof when in its folded and stored condition.

A further object of the invention is to improve the tent supporting structure to provide one which may be quickly and readily assembled and disassembled and which will be rigid in its assembled form.

A further object of the invention is to provide improved means for hinging the bed sections so that they may be folded into the body of the vehicle in a manner to economize space and when unfolded for use will be substantially supported.

A further object of the invention is to provide readily accessible and conveniently located compartments for the storage of such camping necessities as a stove, dishes, cooking utensils, food and the like.

In the accompanying drawing:—

Figure 1 is a rear view of a vehicle embodying my improvements, one half of the view showing the parts in folded position and the other half in unfolded position.

Fig. 2 is a perspective view of the parts in complete unfolded position.

Fig. 3 is an end view of a portion of one of the bed supporting frames and a portion of the tent covering supports.

Fig. 4 is a top plan view of a portion of the tent cover support.

Fig. 5 is a top plan of a portion of the ridge piece and two of the rafters connected therewith.

Fig. 6 is a side view of the upper end of one of the rafters.

Fig. 7 is a side view of the upper end of an opposing rafter showing the end of the ridge bar.

Fig. 8 is a top plan of the forward part of the vehicle body with the bed supports and covers removed showing the storage compartments.

Fig. 9 is a vertical section of the vehicle body with covers and bed supports removed and showing the ends of the storage compartments.

Fig. 10 is a vertical section of the vehicle body with some of the parts removed showing the manner of hinging the bed supports.

Fig. 11 is a side view of a portion of the vehicle body and one of the bed supports showing one of the hinges for the same.

Referring to the drawings, 1 and 2 represent the sides of the vehicle body, 3 the floor, 4 the front, 5 the end and 6 the end gate. The body is supported in any suitable way upon a pair of carrying wheels 7 over which are arranged fenders 8. Hinged to the upper edge of each body side is a cover 9 which, when opened to the position shown in Fig. 2 and at the right in Fig. 1, rests upon and is supported by the fender. When the covers are folded to the position shown at the left in Fig. 1 they completely inclose the top of the body and one of the covers is provided with an off set projecting strip 10 to overlap the other cover to furnish a weather tight joint.

Referring to Figs. 8 and 9, the forward part of the floor is provided with a series of openings 11 of different sizes and beneath each opening is located a compartment 12, constructed in any suitable manner to furnish storage space, the larger compartment being suitable for storage of a stove and the other compartment may receive such articles as dishes, cooking utensils, food and the like.

Hinged to each side of the vehicle body is a frame to receive a mattress M consisting of end rails 13 and longitudinal rails 14 and 21 each frame when opened up to the position shown in Fig. 1 being supported by movable legs 15. The frames are so hinged that when folded into the body they will lie one upon the other in a horizontal position upon the floor 3. The manner of hinging is shown in detail in Figs. 10 and 11. To the under side of longitudinally extending strengthening strips 16 secured to and arranged along the upper inside portion of each body side is secured a leaf 17 to which is pivotally connected a leaf 18, and pivotally connected to the other end of the leaf 18 is a third leaf 19. Secured to and extending longitudinally along the inside upper edge of each body side is another strip 20 of the same dimensions as the strip 16. The leaves 19 are connected to the bed rail 21 which is of angle form. It will be observed that the intermediate leaf 18 on one side of the body (the one to the left in Fig. 11 in the present case) is shorter than the one on the other side, the difference in length being substantially equal to the thickness of a bed frame and its mattress. As a result of this construction, when the parts are folded within the body, one of the frames and its mattress, that is, the one with the shorter hinge leaf, will lie on the top of the other mattress and its frame as indicated in dotted lines in Fig. 10. When the bed frames are unfolded, the edge of the vertical portion of each angle bar 21 will rest upon the longitudinal strips 20, thus furnishing a firm support for the inner side of each of the bed frames.

The tent support has four vertical standards 22 hinged as at 23 to each outside corner of the bed frames preferably to ears riveted to the rails 14. Tie bars 24 permanently connect the upper ends of each pair of uprights and four rafters 25 extend from the tie bar to a ridge rail 26. Referring to Figs. 3 to 7 inclusive, the lower end of each rafter is formed with a notch and is fitted to its corresponding tie rail 24, between blocks 27 secured to the tie rail as shown in Fig. 4. The upper end of each rafter 25 is provided with a metallic loop 28 through which is inserted the ridge rail 26, the end of the ridge rail being rectangular in cross-section and the loops correspondingly formed as indicated in Figs. 6 and 7. Braces 29 are removably connected with each of the standards and also with the end rails of the bed frames and to further stiffen the structure and tie the parts together ropes 30 are connected to the ends of each of the tie bars 24. The rope 30 is extended diagonally to the bar end of the ridge rail 26, threaded through an opening in the same and then extended diagonally to the bar end of the opposite tie bar 24 and secured to the same. The other rope is correspondingly arranged. When it is desired to dismantle the tent support, the ropes are removed, the rafters and ridge rail lifted bodily from the frame supports and disconnected from each other and the braces 29 disconnected from both the uprights and the bed rails. The uprights and tie bars may then be folded upon the mattress of each bed and the beds folded into the body of the vehicle in the manner before described.

In the unfolded position of the parts, it will be noticed that a space is provided between each of the bed frames and its adjacent cover which may be utilized for storage purposes.

Having thus described my invention, I claim:—

1. In a vehicle of the character described, a body having sides, longitudinally extending strips secured to the inner surface of each of said sides along the upper edge thereof, each of said sides also having below said strips blocks of substantially the same dimensions as said strips, a pair of bed frames, hinges for connecting each of said frames to said blocks, said hinges consisting of leaves connected to the bed frames and to the blocks respectively and an intermediate leaf hinged thereto, the intermediate leaves for one of said bed frames being shorter than the intermediate leaves for the opposite bed frame so that when folded into said body one of said bed frames will lie upon the other 2. In a vehicle of the character described, a body having sides, a bed frame pivotally connected to each of said sides, the hinged connections being so constructed as to permit the bed frames to be folded into the lower portion of the body with one of said frames lying upon the other, and covers for said body, one of said covers having an overlapping portion.

3. In a vehicle of the character described, a main body portion, wheels upon which said body is mounted, fenders for said wheels, a pair of covers pivotally connected to said sides and adapted when opened to rest upon said fenders, a pair of bed frames hinged to said sides and arranged to be folded within said body and unfolded therefrom together with supports for the free edges of said bed frames when in unfolded position, the construction and arrangement being such that when the parts are in unfolded position a storage space will be provided between the covers and bed frames.

4. In a vehicle of the character described, a body, foldable bed supports pivotally connected to said body, hinged frames pivotally connected with the free ends of said supports, upwardly inclined rafters removably supported by said frames, and a ridge rail the respective ends of which are extended into sockets in the upper ends of said rafters.

5. In a vehicle of the character described, a body, bed frames foldable in the said body and pivotally connected therewith together with supports for the same in their unfolded condition, upright posts at each end of the outer edge of the respective bed frames and pivotally connected therewith, longitudinal bars connecting the upper ends of each pair of posts, rafters at each end of said bars removably supported thereby, a ridge rail removably connected to the upper end of said rafters, and pivoted braces removably secured to the upright posts and to the bed frames.

6. In a tent support, vertical side frames, rafters removably supported by said side frames, a ridge rail removably connected to the upper end of said rafters, and a flexible cord connecting corresponding ends of each side frame, said cord being extended through an opening in the opposite end of said ridge rail.

7. In a vehicle of the character described, a body, bed frames hinged to the respective sides of said body and arranged to be extended laterally therefrom, together with means for supporting the free edges of said frames, tent side frames hinged to the free edges of said bed frames, a series of rafters removably supported by said side frames, a ridge rail removably connected to the upper ends of said rafters, and flexible cords or the like connecting the side frame and rafters.

In testimony whereof, I have hereunto set my hand this 11th day of March, 1919.

WILLIAM J. HANNAM.

Witness:
　CHAS. I. WELCH.